United States Patent [19]

Nielinger et al.

[11] 4,219,636

[45] Aug. 26, 1980

[54] PREPARATION POLYAMIDES OF ISOPHTHALIC ACID AND HEXAMETHYLENE DIAMINE WITH FORMIC ACID

[75] Inventors: Werner Nielinger; Dieter Neuray; Bert Brassat, all of Krefeld, Fed. Rep. of Germany

[73] Assignee: Bayer Aktiengesellschaft, Fed. Rep. of Germany

[21] Appl. No.: 944,747

[22] Filed: Sep. 22, 1978

[30] Foreign Application Priority Data

Sep. 28, 1977 [DE] Fed. Rep. of Germany ....... 2743515

[51] Int. Cl.² ............................................. C08G 69/28

[52] U.S. Cl. .................................. 528/318; 528/310; 528/324; 528/326; 528/336; 528/340; 528/346; 528/349

[58] Field of Search ...................... 528/336, 318, 347

[56] References Cited

U.S. PATENT DOCUMENTS

| | | | |
|---|---|---|---|
| 2,715,620 | 8/1955 | Carlston et al. | 528/347 |
| 2,742,496 | 4/1956 | Lum et al. | 528/347 |
| 3,325,342 | 6/1967 | Bonner | 528/347 |
| 3,379,695 | 4/1968 | Wolfes et al. | 528/347 |
| 3,454,536 | 7/1969 | Schade et al. | 528/347 |

*Primary Examiner*—Harold D. Anderson
*Attorney, Agent, or Firm*—Connolly and Hutz

[57] ABSTRACT

Processes for the production of polyamides wherein a salt of isophthalic acid and hexamethylene diamine are polycondensed in the presence of formic acid.

5 Claims, No Drawings

PREPARATION POLYAMIDES OF ISOPHTHALIC ACID AND HEXAMETHYLENE DIAMINE WITH FORMIC ACID

This invention relates to polyamides of isophthalic acid and hexamethylene diamine which have been prepared with the addition of formic acid.

Polyamides of isophthalic acid and hexamethylene diamine have been disclosed in U.S. Pat. Nos. 2,715,620 and 2,742,496. They may be prepared by known processes, for example by the polycondensation of hexamethylene diamine and isophthalic acid dihalide at low temperatures in solution or at the phase interface or by polycondensation of isophthalic acid and hexamethylene diamine in the solvent-free state.

The solvent-free polycondensation of monomers is carried out by methods analogous to that used for the preparation of 6,6-polyamide. The conventional commercial monomers may be used either directly or in the form of a salt which is prepared by a separate process.

According to the German Offenlegungsschrift DT-OS 2647 311, polycondensation of the salt may advantageously be carried out without separate purification of the salt.

It is generally known that for numerous fields of application of polyamides it is necessary to regulate the viscosity of the polyamides to produce products having a suitable melt viscosity and suitable, reproducible processing properties. This is generally achieved by the addition of monocarboxylic acids during polycondensation of the monomers. According to the teaching of U.S. Pat. No. 2,174,527, many different monocarboxylic acids may be used for this viscosity regulation, but formic acid is not mentioned. However, investigations carried out using formic acid in the polycondensation of caprolactam have shown that this acid acts as a sort of polycondensation accelerator and leads to high molecular weight products much more rapidly than if polycondensation is carried out without the addition of formic acid (see U.S. Pat. No. 2,562,797). It was therefore quite unexpected that formic acid would be suitable for regulating or stabilising the viscosity of polyamides, particularly since, according to the information given in the above-mentioned reference, it undergoes decomposition under the conditions of polycondensation.

It was therefore surprising to find that formic acid is eminently suitable for regulating the viscosity in the condensation of isophthalic acid and hexamethylene diamine and optionally other monomers.

The present invention therefore relates to a process for the production of transparent polyamides by the polycondensation of salts of isophthalic acid and hexamethylene diamine and from 0 to 30 mol % of the salt of isophthalic acid and a bis-(4-aminocyclohexyl)-alkane or of a salt of isophthalic acid and isophorone diamine or of an amino carboxylic acid or a lactam, wherein the polycondensation is carried out in the presence of from 0.01 to 5 mol %, preferably from 0.1 to 3 mol %, of formic acid, based on the quantity of the salts to be polycondensed.

Compounds which form formic acid, i.e., formic acid donors such as sodium formate, formamide or dimethyl formamide or esters of formic acid, may be used instead of formic acid itself.

Up to 30 mol % of the isophthalic acid which is used to build the salt for the polycondensation may be replaced by terephthalic acid. Suitable comonomers are further isophorone diamine, the bis-(4-aminohexyl)-alkanes corresponding to the following general formula:

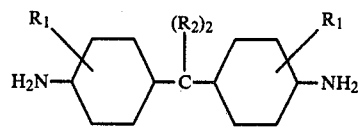

wherein $R_1$ and $R_2$, which may be the same or different, each represents hydrogen or a $C_1$–$C_3$ alkyl group; preferably bis-(4-aminocyclohexyl)-methane, bis-(4-aminocyclohexyl)-propane, bis-(4-amino-3-methyl cyclohexyl)-methane or aminocarboxylic acids or lactams having from 5 to 12 carbon atoms, such as ε-caprolactam, lauric lactam and 11-amino undecanoic acid.

To prepare the polyamide, the diamine component and isophthalic acid may be first reacted in water to form a from 50 to 85% by weight salt solution which is then polycondensed by known processes, preferably without the salt being first isolated. Formic acid may be added to the salt solution before polycondensation, but is preferably added to the water before preparation of the salt. However, the salt may also be prepared in other solvents or dispersing agents, such as alcohols or alcohol/water mixtures. Methanol and ethanol, for example, are suitable alcohols for this purpose. The thus prepared salts, which are preferably isolated from the solvents after they have been prepared, are polycondensed in known manner after the addition of formic acid.

The salt solution is preferably first precondensed in a sealed autoclave at about 210° C. under the autogeneous reaction pressure, and the pressure is then released and polycondensation is continued at atmospheric pressure and at temperatures of from 260° to 300° C. until equilibrium is established.

To obtain products having technically useful properties, a molecular weight corresponding to a relative viscosity of at least $\eta_{rel}=2.2$ (determined using a 1% by weight solution of the polyamide in m-cresol at 25° C.) should be reached.

Excellent properties are obtained if the relative viscosity is adjusted to values of from 2.2 to 3.5, preferably from 2.5 to 3.0

The polyamides according to the present invention are non-crystalline, completely transparent and colourless. They are distinguished by the great toughness and can be easily processed.

The polyamides may be processed by injection moulding or extrusion in the conventional machines to produce moulded articles, foils, boards, fibres, bristles or hollow bodies. They may also be used as electrical insulating materials by virtue of the electrical properties thereof.

They may also contain fillers, in particular glass fibres, mould-release agents, lubricants, fire-retarding agents, stabilisers or pigments or other dyestuffs in known amounts.

Example 1

(a) Preparation of a salt or isophthalic acid and hexamethylene diamine.

830.6 g (5 mol) of isophthalic acid are suspended in 6.25 ml of ethanol. A solution of 586.8 g (5 mol with 1%, by weight, excess) of hexamethylene diamine in 805 ml of ethanol is added at the reflux temperature under nitrogen with stirring over a period of 1 hour. After the addition of hexamethylene diamine, the suspension of the resulting salt is heated a further hour and then suction filtered after cooling. The salt is washed once with ethanol and dried under vacuum at 100° C. It is used without further purification for the preparation of the polyamide.

(b) Polycondensation of the salt.

112.9 g of the above prepared salt of isophthalic acid and hexamethylene diamine and 0.93 g of hexamethylene diamine (2%, by weight, based on the diamine content in the salt to compensate for the losses occurring during polycondensation) are polycondensed under a nitrogen atmosphere with stirring, first at 220° C. for 2 hours and then at 270° C. for 3 hours. A transparent polyamide which swells to a considerable extent in m-cresol and is no longer soluble is obtained.

When the above described polycondensation is carried out with the addition of 0.18 g (1 mol %) of formic acid, the polyamide obtained is completely soluble in m-cresol. The relative viscosity of this polyamide, determined using a 1% by weight solution of the polyamide in m-cresol at 25° C. in an Ubbelohde-Viskosimeter is 2.71.

Example 2

A solution of 3.835 kg (33 mol) of hexamethylene diamine and 15.19 g (1 mol %, based on hexamethylene diamine) of formic acid in 3.1 kg of water is prepared with the exclusion of atmospheric oxygen and 5.482 kg of isophthalic acid are added over a period of about 40 mins. at ca. 85° C. The pH of a sample diluted to a solids content of 5%, by weight, is 6.2.

The clear solution is introduced while still hot into an autoclave which is filled with nitrogen. The autoclave is sealed and the contents are condensed with stirring for 1 hour at 210° C., establishing a pressure of ca. 19 bar. The pressure is then carefully released while the autoclave is heated and water is distilled off. Polycondensation is then continued under nitrogen for 3 hours at 270° C.

The polyamide is then drawn off as a bristle through a water bath, granulated and dried. A transparent, colourless material having a relative viscosity of 2.6, determined using a 1% by weight solution of the polyamide in m-cresol at 25° C. in an Ubbelohde-Viskosimeter, is obtained.

The polyamide is processed in a commercial injection moulding machine to produce transparent moulded articles on which the following properties were determined.

| Impact strength | Deutsche Industrie Norm (DIN 53 453) | unbroken |
| --- | --- | --- |
| Notched impact strength | (DIN 53 453) | 2.9 kJ/m$^2$ |
| Elongation on tearing | (DIN 53 455) | 41% |

A polyamide having a relative viscosity of 2,8 which had been prepared by an analogous method, but without the addition of formic acid, had the following properties:

| Impact strength | (DIN 53 453) | unbroken |
| --- | --- | --- |
| Notched impact strength | (DIN 53 453) | 1.9 kJ/m$^2$ |
| Elongation on tearing | (DIN 53 455) | 25% |

We claim:

1. A process for the production of a transparent solid polyamide which comprises polycondensing a salt of isophthalic acid and hexamethylene diamine in the presence of from 0.01 to 5 mol %, based on the salt, of formic acid or a formic acid donor.

2. A process as claimed in claim 1 in which from 0.1 to 3 mol %, based on the salt, of formic acid or a formic acid donor is used.

3. A process as claimed in claim 1 wherein up to 30 mol % of the isophthalic acid is replaced by terephthalic acid.

4. A process as claimed in claim 1 wherein up to 30 mol % of a salt of isophthalic acid and a bis(4-aminocyclohexyl)alkane or a salt of isophthalic acid and isophorone diamine or of an amino carboxylic acid or a lactam is used.

5. A process as claimed in claim 4, wherein as bis-(4-aminocyclohexyl)alkane, bis-(4-aminocyclohexyl)-methane, bis-(4-aminocyclohexyl)-propane or bis-(4-amino-3-methyl cyclohexyl)-methane and as lactam or amino acid ε-caprolactam, lauric lactam or the corresponding amino acids or 11-aminoundecanoic acid are used.

* * * * *